June 21, 1932.  R. C. HOFFMAN  1,864,247
SPRING SUSPENSION
Filed April 8, 1930   2 Sheets-Sheet 1
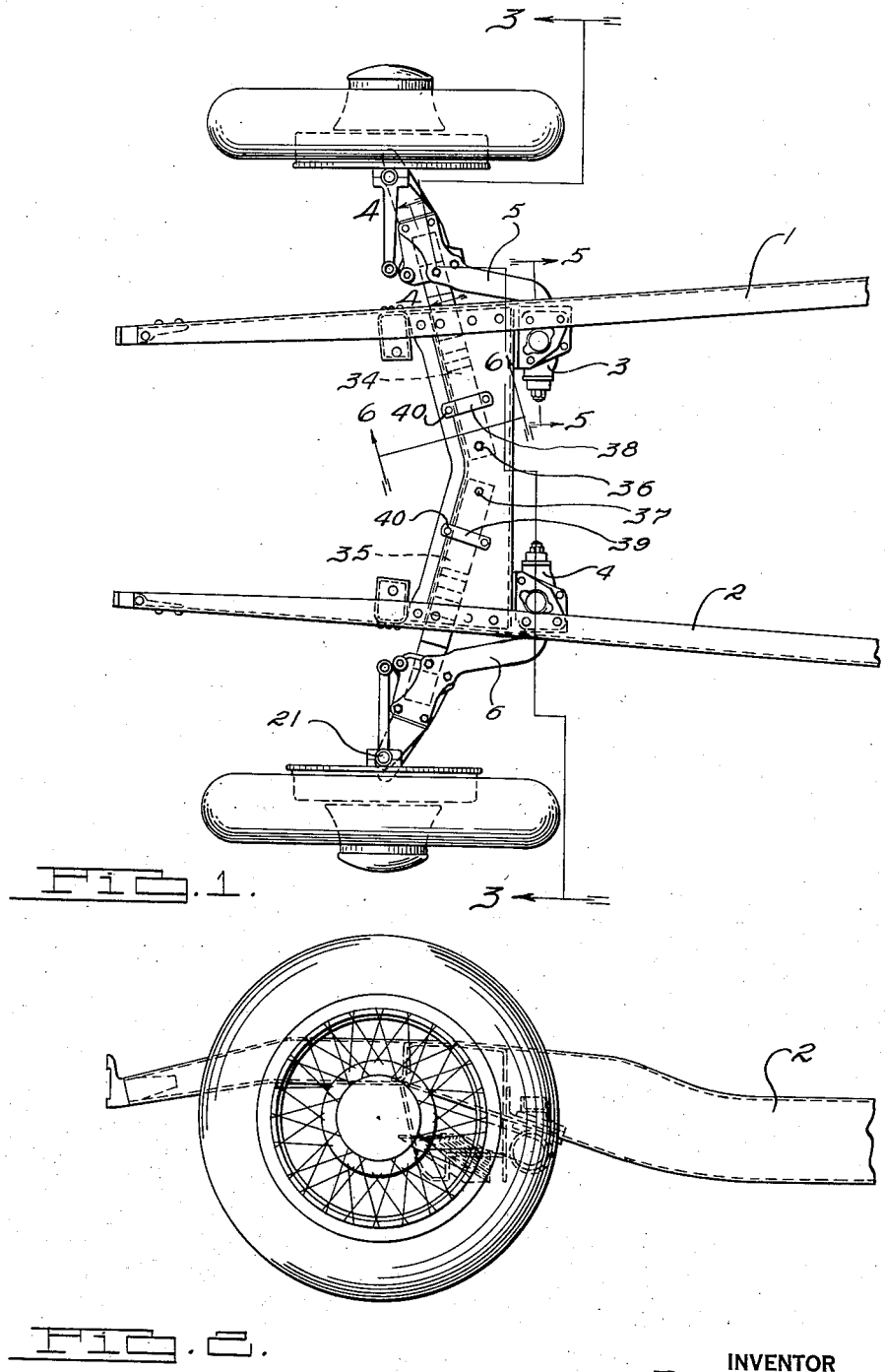
INVENTOR
Roscoe C. Hoffman.
BY
ATTORNEYS.

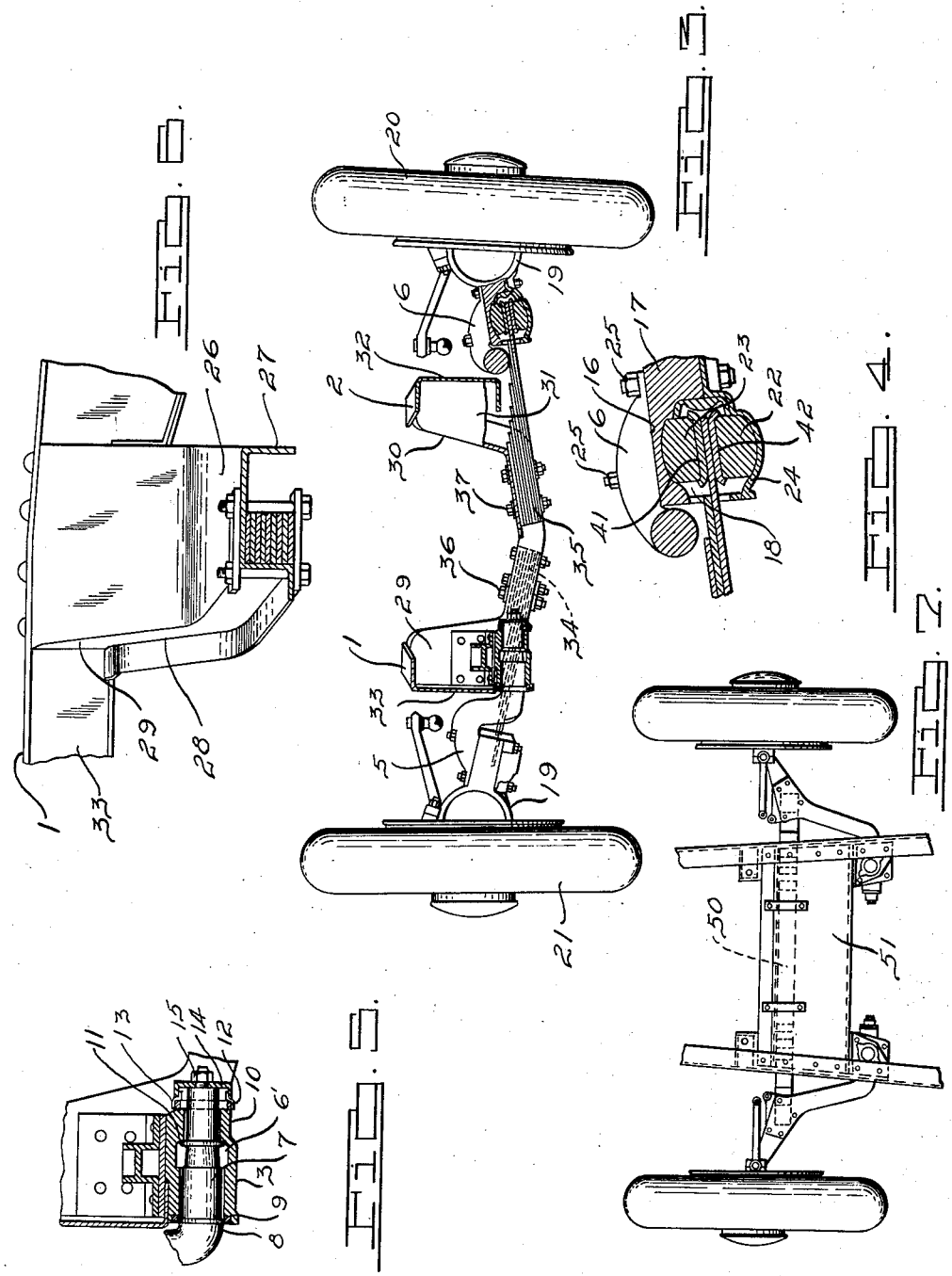

Patented June 21, 1932

1,864,247

UNITED STATES PATENT OFFICE

ROSCOE C. HOFFMAN, OF DETROIT, MICHIGAN

SPRING SUSPENSION

Application filed April 8, 1930. Serial No. 442,647.

This invention relates to vehicle chassis construction, particularly to improved road wheel mountings and spring suspension thereof.

The main objects of the invention are to provide an improved wheel mounting for a motor vehicle by which the relative amount of unsprung weight is materially reduced over conventional constructions; to provide an improved mounting by which the front wheels of a vehicle are supported for independent movement in substantially vertical planes; to provide a journaled trunnion arm for supporting each of the front wheels of a vehicle; to provide spring means extending transversely of the vehicle yieldably coacting with said trunnion arms so as to permit independent spring action at respectively opposite sides of a vehicle chassis; to provide separate springs for independently coacting with the free ends of the trunnion arms; to provide rearwardly converging transverse springs which extend at an angle to the line of axes of the trunnion arm and in the same general direction as said arm, the arms extend so as to reduce torsional flexure of said springs; and to provide improved structure for mounting springs of this kind on a chassis frame.

An illustrative embodiment of my invention is shown in the accompanying drawings, in which:

Fig. 1 is a fragmentary plan view of the front end portion of a vehicle chassis embodying my improved spring suspension and wheel mountings.

Fig. 2 is a side elevation of the front end of the vehicle chassis.

Fig. 3 is a transverse vertical section taken on the line 3—3 of Fig. 1.

Fig. 4 is a vertical section taken on the line 4—4 of Fig. 1.

Fig. 5 is a vertical section taken on the line 5—5 of Fig. 1.

Fig. 6 is a perspective view, partly in section, of the spring supporting structure.

Fig. 7 is a view similar to Fig. 1, showing a slightly modified form of construction.

In the forms shown, the invention is illustrated in connection with a vehicle chassis which includes a frame having longitudinal, spaced side members 1 and 2 on which bearing blocks 3 and 4, respectively, are mounted. Journaled in the bearing blocks 3 and 4 are trunnion arms 5 and 6, respectively, which extend outwardly and forwardly from the sides 1 and 2 of the chassis frame.

The bearing blocks 3 and 4 each have a cylindrical passage 6' therein in which the inner end portion 7 of the trunnion arms 5 and 6 are journaled. The end portion 7 has a shoulder 8 which registers with a packing washer 9 located at the outer extremity of the passage 6'. A flange 10 formed on the intermediate part of the inner end portion 7 of the arm bears against a shoulder 11 on the wall of the passage 6' and the inner end portion of the passage 6' and journaled part 7 of the trunnion arm are of reduced diameter as compared with the outer end portion of the passage 6'.

The journaled part 7 of the trunnion arm extends beyond the inner extremity of the passage 6' and is provided with a packing washer 12 which is firmly held upon the journaled part 7 by a metal ring 13. A cap 14 is firmly held on the inner extremity of the journaled part 7 by a bolt 15. The cap 14 seats upon the ring 13 and secures the trunnion arm against outward movement relative to the bearing block.

The outer ends of the trunnion arm 5 and 6 each have a flat seat 16 formed on their underside to which is secured a wheel supporting structure or steering knuckle 17, having a downwardly opening socket 18 at one end and a yoke 19 at the other end. Road-wheels 20 and 21, respectively, are mounted on the yoke 19 of the right and left sides of the vehicle chassis in a conventional manner by king pins 21. Blocks 22 and 23 of yieldable material, preferably rubber, are enclosed in the socket 18 by a cover 24. The cover 24 and steering knuckle 17 are rigidly mounted on the outer end of the trunnion arm by bolts 25, which extends through registering apertures in the trunnion arm, knuckle and cover.

Extending between the side members 1 and 2, slightly in advance of the bearing blocks 3 and 4 is a transverse supporting structure of channel-shape which has an intermediate web part 26, a rear flange 27, that is substantially normal to the longitudinal axis of the vehicle chassis, and rearwardly converging front vertical flange portion 28.

The intermediate part of the transverse supporting structure is located below the side members 1 and 2 and the end portions 29 and 30 of the supporting structure extend upwardly at diverging inclinations abutting the side members 1 and 2. The side flanges 31 of the end portions 29 and 30 of the supporting structure are substantially wider than the flange 28 of the intermediate portion thereof and they extend and outwardly engage the webs 32 and 33 of the side members 1 and 2, respectively, of the chassis frame.

A pair of leaf springs 34 and 35 are located adjacent the forwardly disposed and diverging flange portion 28 of the transverse supporting structure and are secured thereto, and preferably in contact therewith as suggested in Fig. 6, by bolts 36 and 37, respectively, which extend through apertures in the leaf of the springs 34 and 35. Clamps 38 and 39 are seated upon the intermediate part of the springs 34 and 35, respectively, and are rigidly secured to the transverse supporting structure by bolts 40. The springs 34 and 35 are preferably of the leaf spring type and they extend outwardly and slightly diagonally with respect to the axes of the frame beyond the sides thereof. The outer extremities of the main leaf of each spring is engaged between metal wear plates 41 and 42 which are located between the rubber shackle blocks 22 and 23, respectively. This construction forms a yieldable connection between the end of the springs 34 and 35 and the outer free end of the trunnion bars 5 and 6, respectively.

In operation, the trunnion arms 5 and 6 tend to rotate under the action of the weight of the chassis frame, engine and body of the vehicle and they also tend to rotate when the wheels 20 and 21 encounter irregularities in the road. Free rotation of the trunnion arms 5 and 6 is yieldably prevented by the springs 34 and 35 which are placed under compression both when the sprung weight of the vehicle is urged downwardly and when the unsprung weight thereof is urged upwardly.

During relative movement between the sprung and unsprung parts of the vehicle, the wheels 20 and 21 are in effect moved up and down relative to the chassis frame in an arcuate path about the axes of the journal 7. This relative movement between the wheels and chassis frame has a slight tendency to cause the springs 34 and 35 to be somewhat torsionally twisted, but by locating the springs 34 and 35 in the slightly divergent relation shown, the normal path of travel of the ends of the trunnion arms 5 and 6 and the springs 34 and 35 nearly coincide, and this twisting action on the springs is thereby materially reduced and by the further employment of the yielding shackles the springs are allowed to flex in their normal manner.

It will be apparent from the foregoing that it is not essential to the broader aspects of the present invention that the load carrying springs be positioned in the slightly divergent relation shown, or that they be entirely independent of each other. For instance, as suggested in Fig. 7, these springs may both be combined into a single transverse multiple leaf spring 50 and may be centrally secured to the cross-member 51, suitably modified from the construction heretofore described to adapt it thereto, and with its opposite ends engaged by the shackles 22, 23 in the manner described. This construction is entirely satisfactory altho resulting in slightly greater relative movement between the outer ends of the trunnion arms and their corresponding springs.

In either of the above described constructions, the wheels themselves constitute substantially all of the unsprung weight that need be taken into consideration, resulting in lesser wear and greater ease in riding than the conventional rigid axle constructions.

Formal changes may be made in the specific embodiment of the invention described without departing from the spirit and substance of the broad invention, the scope of which is commensurate with the appended claims.

What I claim is:

1. In a vehicle chassis, a frame, a trunnion arm journaled on one side of said frame and extending outwardly therefrom diagonally with respect to the axis of said frame, front wheel supporting structure rigidly mounted on said arm, a wheel on said structure, and a spring mounted on said frame extending outwardly from the side thereof at an angle to the axis of said frame and connected at its end with the free end of said trunnion arm for resiliently limiting rotation of said arm relative to said frame.

2. In a vehicle chassis, a pair of cranklike trunnion arms, one journaled on each side of said frame of said chassis, and means for individually controlling each trunnion arm respectively including a pair of leaf springs, each extending transversely outwardly from said frame and connected with the free end of an adjacent trunnion arm for yieldably holding said arm in a substantially horizontal position.

3. A vehicle chassis comprising a frame, a pair of trunnion arms, one journaled on each side of said frame and each diverging outwardly therefrom at an angle to the axis of said frame, a wheel mounted on the free end of said trunnion arms, and a pair of leaf springs mounted on said frame, each diverging outwardly therefrom at an angle to the axis of said frame, the outer ends of said springs being connected with the free ends of said trunnion arms for resiliently resisting rotation of said arms.

4. A vehicle chassis comprising a frame, a pair of trunnion arms, one journaled on each side of said frame and each diverging outwardly therefrom at an angle to the axis of said frame, a wheel mounted on the free ends of said trunnion arms, a pair of leaf springs mounted on said frame, each diverging outwardly therefrom at an angle to the axis of said frame, and rubber shackles on said trunnion arms forming a yieldable connection between the latter and said springs.

5. In a vehicle chassis, a frame, wheel supporting members journaled on said frame having axes extending transversely thereof and including a forwardly extending free end portion, wheels mounted on the free end portions of said arms, and resilient members mounted independently of each other on said frame, each connected with the free end of one of said wheel supporting members respectively for governing the relative vertical movement of said frame and each of said wheels individually.

6. In a vehicle chassis, a pair of wheel supporting members journaled on said frame having outwardly extending forwardly offset free end portions, wheels journaled thereon, and transverse resilient members mounted independently of each other at their adjacent portions on said chassis, the outer ends of said resilient members coacting with the free ends of said wheel supporting members for individually governing rotation of said supporting members relative to said frame.

7. In a vehicle chassis, a frame, a pair of trunnion arms, one journaled on each side of said frame and each extending diagonally outwardly therefrom in diverging relation to the other, front wheel supporting structures rigidly mounted on each arm, a pair of wheels, one journaled on each supporting structure, and a pair of springs mounted on said frame each extending outwardly from one of the opposite sides thereof at an angle to the axis of said frame and connected at its end with the free end of a trunnion arm for individually limiting rotation of said arms relative to said frame.

ROSCOE C. HOFFMAN.